US010996919B2

(12) United States Patent
Kotteri et al.

(10) Patent No.: US 10,996,919 B2
(45) Date of Patent: May 4, 2021

(54) PROVIDING HISTORICAL CAPTURED AUDIO DATA TO APPLICATIONS

(71) Applicant: Microsoft Technology Licensing, LLC, Redmond, WA (US)

(72) Inventors: Kishore Arvind Kotteri, Sammamish, WA (US); Firoz Dalal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 16/214,924

(22) Filed: Dec. 10, 2018

(65) Prior Publication Data
US 2020/0104093 A1 Apr. 2, 2020

Related U.S. Application Data

(60) Provisional application No. 62/738,743, filed on Sep. 28, 2018.

(51) Int. Cl.
*G06F 3/16* (2006.01)
*G10L 15/04* (2013.01)
(Continued)

(52) U.S. Cl.
CPC ............ *G06F 3/165* (2013.01); *G06F 3/167* (2013.01); *G06F 40/284* (2020.01); *G06F 40/289* (2020.01); *G10L 15/04* (2013.01)

(58) Field of Classification Search
CPC .......... G06F 3/165; G06F 3/167; G06F 3/162; G06F 40/284; G06F 40/289; G10L 15/04; G10L 17/22
See application file for complete search history.

(56) References Cited

U.S. PATENT DOCUMENTS

2014/0337131 A1 11/2014 Edara
2015/0066494 A1* 3/2015 Salvador ................ G06F 3/167
704/224
(Continued)

FOREIGN PATENT DOCUMENTS

EP 3101533 A1 12/2016
EP 3141987 A1 3/2017

OTHER PUBLICATIONS

"International Search Report and Written Opinion Issued in PCT Application No. PCT/US2019/039126", dated Oct. 9, 2019, 12 Pages.
(Continued)

*Primary Examiner* — Yogeshkumar Patel
(74) *Attorney, Agent, or Firm* — Alleman Hall Creasman & Tuttle LLP

(57) ABSTRACT

An audio capture method is performed by a computing system. A plurality of applications is instantiated. An audio data stream is received via audio capture hardware. The audio data stream is stored in a memory space accessible by the plurality of applications. A trigger associated with an application of the plurality of applications is detected. A history segment of the audio data stream is provided from the shared memory space to the application based on the trigger. The history segment is captured prior to the trigger. A contemporary segment of the audio data stream is provided to the application based on the trigger. The contemporary segment is captured subsequent to the trigger.

18 Claims, 6 Drawing Sheets

(51) Int. Cl.
*G06F 40/284* (2020.01)
*G06F 40/289* (2020.01)

(56) References Cited

U.S. PATENT DOCUMENTS

2016/0357508 A1* 12/2016 Moore .................... G06F 3/162
2016/0371581 A1   12/2016 Waltermann et al.
2017/0090864 A1    3/2017 Jorgovanovic
2018/0063326 A1    3/2018 Tichauer et al.
2018/0152557 A1    5/2018 White et al.

OTHER PUBLICATIONS

"Alexa and Alexa Device FAQs", Retrieved from: https://web.archive.org/web/20180807171204/https:/www.amazon.com/gp/help/customer/display.html?nodeId=201602230&pop-up=1, Aug. 7, 2018, 13 Pages.

Marshall, Don, "Voice Activation", Retrieved from: https://docs.microsoft.com/en-us/windows-hardware/drivers/audio/voice-activation, May 14, 2018, 16 Pages.

* cited by examiner

PROVIDING HISTORICAL CAPTURED AUDIO DATA TO APPLICATIONS

CROSS REFERENCE TO RELATED APPLICATIONS

This application claims priority to U.S. Provisional Patent Application Ser. No. 62/738,743, filed Sep. 28, 2018, the entirety of which is hereby incorporated herein by reference for all purposes.

BACKGROUND

An operating system of a computing system may be configured to control access to audio capture hardware of the computing system, such as a microphone. As such, different applications may have to request and be granted access to the microphone in order to obtain an audio data stream captured by the microphone. In some examples, the operating system may grant microphone access to a plurality of applications at the same time so that each application can capture an audio data stream via the microphone. In such examples, each of the plurality of applications may receive a separate audio data steam from the microphone and store the audio data stream in memory space allocated for the application. In other words, a different audio data stream may be created by each application and stored in a different memory space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An audio capture method is performed by a computing system. A plurality of applications is instantiated. An audio data stream is received via audio capture hardware. The audio data stream is stored in a shared memory space accessible by the plurality of applications. A trigger associated with an application of the plurality of applications is detected. A history segment of the audio data stream is provided from the shared memory space to the application based on the trigger. The history segment is captured prior to the trigger. A contemporary segment of the audio data stream is provided to the application based on the trigger. The contemporary segment is captured subsequent to the trigger.

DETAILED DESCRIPTION

Figure 1A:
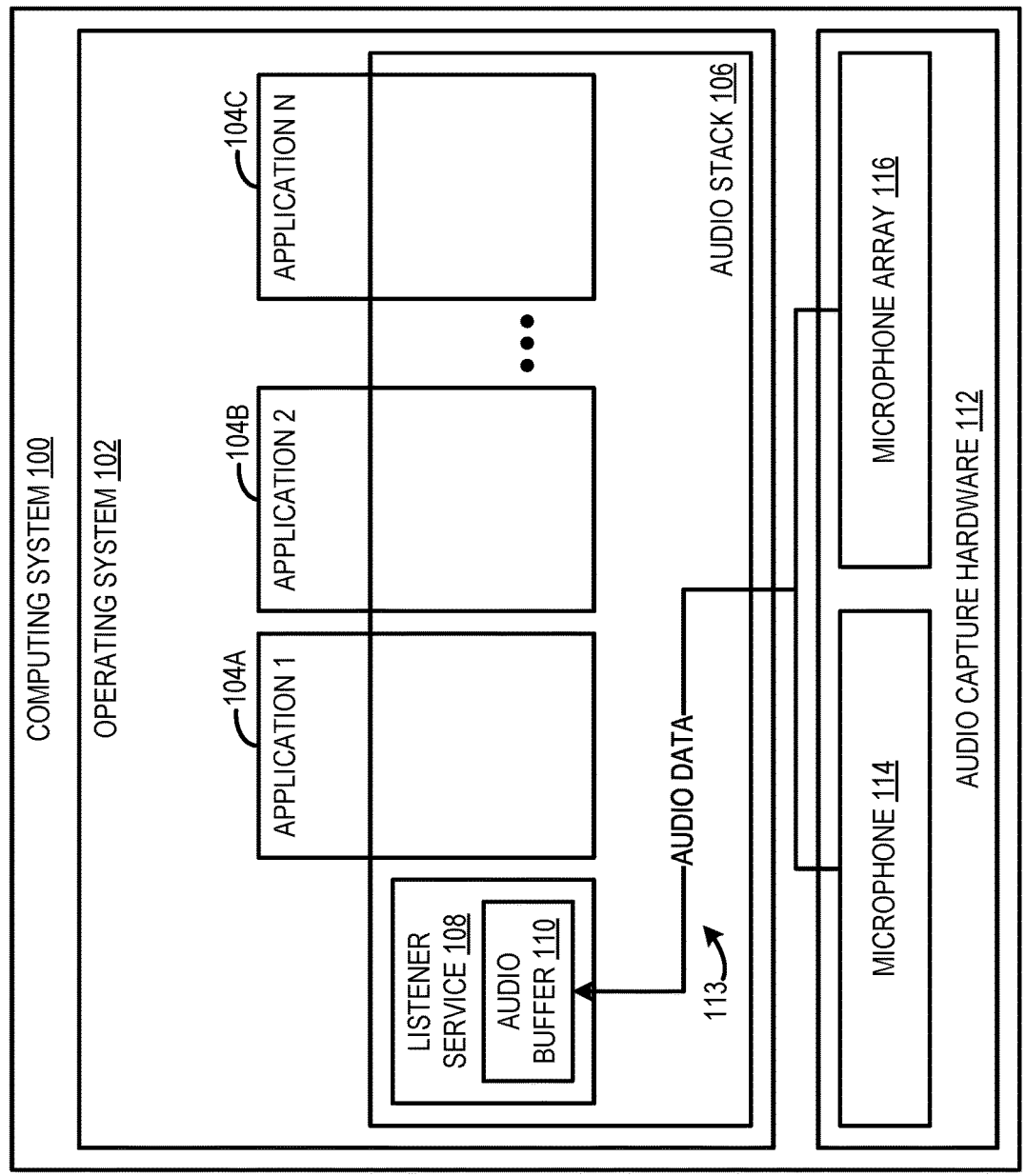
FIGS. 1A-1D shows example scenarios where an operating system of a computing system provides different applications with historical captured audio data based on detection of different triggers associated with the different applications.

As discussed above, in some examples, a different audio data stream may be created by each application of a plurality of applications and stored in a different memory space associated with that application. This may create a scenario where multiple applications are continuously capturing duplicate audio data streams that each include the same audio content. For example, multiple different applications may capture separate audio data streams while continuously listening for various verbal phrases that trigger the application to perform application-specific operations. Duplicating the same audio data streams at the application level may negatively affect overall power consumption, memory usage, processor utilization, and/or other aspects of the computing system.

Furthermore, it will be noted that in such examples, the audio data stream received by each application may only correspond to audio captured after the request for access to the microphone is granted to the application. As such, the application requesting access to the microphone would not have access to audio that occurs prior to the operating system granting the application access responsive to the application's request.

Accordingly, this disclosure is directed to an audio capture approach that includes providing historical captured audio data to one or more applications of a computing system. An audio data stream may be received from audio capture hardware of the computing system (e.g., a microphone). The audio data stream may be stored in a shared memory space that is accessible by different applications of the computing system. A trigger associated with an application may be detected. A history segment of the audio data stream may be provided from the shared memory space to the application based on the trigger. The history segment may be captured prior to the trigger. A contemporary segment of the audio data stream may be provided to the application base on the trigger. The contemporary segment may be captured subsequent to the trigger.

By storing the audio data stream in a shared memory space at the operating system level such that different applications can access the audio data stream and provide segments of the audio data stream to different applications based on detecting different triggers associated with the different applications, the audio data stream does not need to be duplicated in its entirety for each application. Moreover, each application may still benefit from receiving audio data captured prior to detection of a trigger associated with the application without having to allocate memory space for the audio data stream prior to the trigger being detected. Because the entirety of the audio data stream does not have to be duplicated for each application at all times, overall power consumption, memory usage, processor utilization, and/or other aspects of the computing system may be improved relative to a computing system where each application continuously captures duplicate audio data from audio capture hardware.

FIGS. 1A-1D shows example scenarios where an operating system provides different applications with historical captured audio data based on detection of different triggers associated with the different applications. A computing system 100 may include an operating system 102. The operating system 102 may be configured to instantiate and manage a plurality of applications 104 (e.g., 104A, 104B, 104C), and an audio stack 106. The audio stack 106 may include a listener service 108 that may be configured to control a shared memory space in the form of a rolling audio buffer 110. The rolling audio buffer 110 may be considered a shared memory space in that the rolling audio buffer 110 may be accessible by each of the plurality of applications 104. It will be appreciated that if only one application is instantiated, then that application may access the shared memory space. Further, if additional applications are subsequently instantiated, then those applications may also gain access to the shared memory space. In other words, the shared memory space may be configured for one or more application without requiring changes as more applications become instantiated and start using the shared memory space.

As shown in FIG. 1A, the computing system 100 may include audio capture hardware 112 that may be configured to capture an audio data stream 113. For example, the audio capture hardware 112 optionally may include a microphone 114 and/or a microphone array 116 each configured to capture audio data. The audio capture hardware 112 may include any suitable audio capture/recording device. The audio capture hardware 112 may be configured to send the captured audio data stream 113 to the listener service 108. The listener service 108 may be configured to store the received, captured audio data stream 113 in the rolling audio buffer 110. When the rolling audio buffer 110 is full and subsequent audio data is received from the audio capture hardware 112, audio data stored in the rolling audio buffer may be overwritten to allow for the new audio data to be stored in the rolling audio buffer 110. For example, the oldest audio data in the rolling audio buffer 110 may be overwritten by the new audio data. The rolling audio buffer is provided as an example of a shared memory space. The listener service 108/audio stack 106 may allocate any suitable type of memory space to capture/store an audio data stream.

In other scenarios, an audio data stream may be received from a remote computing device and the audio data stream may be captured/stored (e.g., an audio conference stream from a remote communication application) in the rolling audio buffer 110 or another memory space allocated by the listener service 108/audio stack 106. It will be appreciated that the listener service 108 may receive any suitable input audio data stream from any suitable source. Further, the listener service 108 may be configured to store the received audio data stream in the rolling audio buffer 110 or another memory space.

The listener service 108 may be configured to, for each of the plurality of applications 104, detect one or more triggers associated with the application. The listener service 108 may be configured to provide at least a segment or portion of the audio data stream stored in the rolling audio buffer 110 to the application based on a detected trigger. In some examples, the listener service 108 may be configured to detect a different set of one or more triggers for each of the plurality of applications. In some examples, a same trigger may be associated with two or more of the plurality of applications 104. In some examples, an application may be configured to detect a trigger and notify the listener service 108 of the trigger instead of the listener service 108 detecting the trigger directly. For example, an application may notify the listener service 108 of a trigger via an Application Programming Interface (API).

A trigger may take any suitable form. In some examples, a trigger may be based on user input. More particularly, in some examples, a trigger may be derived from audio data captured by audio capture hardware 112, such as verbal keywords. In one particular example, an application may be configured to provide a virtual assistant and a trigger may be a verbal phrase that addresses the virtual assistance (e.g., "Hey Cortana"). In some examples, a trigger may be based on operation of other computing hardware and/or peripheral devices. For example, a trigger may be based on motion captured by a camera. In another example, a trigger may be based on a press of a button or another type of input from a user input device. In some examples, a trigger may be based on an operating mode or state of an application, the computing system, and/or an operating mode or state or other aspect of another computing system.

As shown in FIG. 1A, the listener service 108 has not detected any trigger so the audio data stream 113 is received from the audio capture hardware 112 and stored in the rolling audio buffer 110 without being provided to any of the plurality of applications. Correspondingly, no application-specific memory space is allocated for any of the plurality of applications to store the audio data stream at the application level.

Figure 1B:
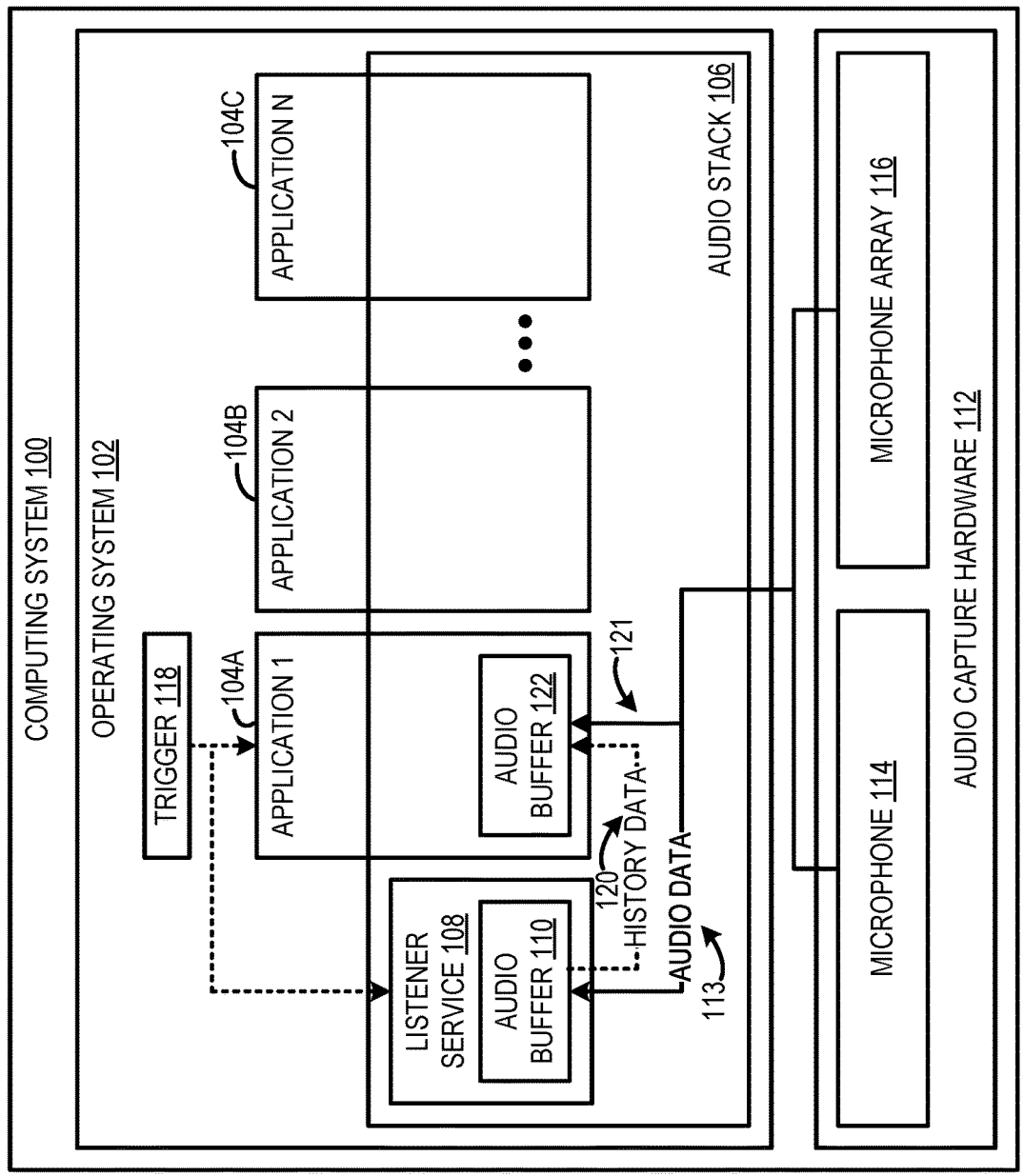

As shown in FIG. 1B, the listener service 108 may detect a first trigger 118 (either directly or via the first application 104A). In response to the first trigger 118, the listener service 108 may be configured to provide a portion of the audio data stream, referred to herein as a history segment or history audio data 120, from the rolling audio buffer 110 to the first application 104A. The history segment or history audio data 120 may be captured during a window of time ranging from a time prior to the first trigger being detected up to (or beyond) the first trigger being detected. Optionally, the first application 104A may store the received history audio data 120 in a first audio buffer 122 associated with and/or controlled by the first application 104A. In other words, the history segment 120 may be copied from the rolling audio buffer 110 to the first audio buffer 122. In some examples, the application-specific memory space/first audio buffer 112 may be instantiated or allocated based on the first trigger.

The history segment 120 may have any suitable length and/or window of time that begins prior to the first trigger being detected. In some examples, the history segment 120 may have a predetermined duration (e.g., a 20 second window leading up to the moment the first trigger was detected). In some examples, the history segment 120 may have a duration that is application specific, such that different applications may receive different history segments having different durations. In some examples, the history segment 120 may have a dynamically adjustable duration that is specified by the application. In some examples, the history segment 120 may have a duration that is trigger specific, such that different triggers may cause different history segments to have different durations. In some examples, the history segment 120 may include a window of time that extends beyond a time at which a trigger is detected. In some examples, the history segment 120 may include all of the audio data stored in the rolling audio buffer 110. In some examples, the history segment 120 may be constrained by a size of the rolling audio buffer 110 and/or the application specific buffer 122. In some examples, audio data stored in either of these buffers may be offloaded to long-term storage. For example, audio data may be written from the application specific buffer to an audio file to create an audio recording.

In some implementations, the rolling audio buffer 110 may be configured to dynamically change size based on various factors. In some examples, the size of the rolling audio buffer may be increased if an application is accessing the rolling audio buffer to acquire audio data (captured before or after a trigger). In another example, the size of the rolling audio buffer may be changed based on an application making a request to the operating system 102 to accommodate an operating condition/state/mode of the application By increasing the size of the audio buffer at the operating system level, the history audio data may be made available to all applications, such that if another different application requests the history data from further in the past then that history data may be made available to that application too.

Furthermore, the listener service 108 optionally may be configured to, in response to detecting the first trigger 118, direct the captured audio data stream 113 from the audio capture hardware 112 to the first application 104A. The segment of the audio data stream captured after the trigger may be referred to herein as a contemporary segment 121 of the audio data stream 113. As such, the first application 104A may receive both the history segment 120 and the contemporary segment 121 of the audio data stream 113 including. In some examples, the first application 104A optionally may store the contemporary segment 121 of the captured audio data stream 113 in the first audio buffer 122. In some examples, the first application 104A may continue to receive the contemporary segment 121 of the audio data stream 113 from the audio capture hardware 112 until the first application 104A notifies the operating system 102 that the first application 104A no longer wants to receive the audio data stream 113. In some examples, the first application 104A may receive the contemporary segment 121 of the audio data stream 113 for a designated duration. In some examples, the first application 104A may continue to receive the contemporary segment 121 of the audio data stream 113 until the listener service 108 detects another trigger that indicates the application is done with the audio data stream 113.

Alternatively, in some implementations, the contemporary segment 121 of the audio data stream 113 may be provided to the first application 104A via the rolling audio buffer 110 instead of being diverted directly from the audio capture hardware 112 responsive to the first trigger 118. In other words, the audio data stream 113 may be provided from the audio capture hardware 112 to the listener service 108. The listener service 108 may store the audio data stream 113 in the rolling audio buffer 110, and the contemporary segment 121 of the audio data stream 113 may be provided from the rolling audio buffer 110 to the first application 104A responsive to the first trigger 118.

The first application 104A may perform any suitable operations based on the history segment 120 (and/or the contemporary segment 121) of the audio data stream 113. In some examples, the first application 104A may be configured to analyze the history audio data 120 (and/or the contemporary segment 121) of the audio data stream 113 to recognize verbal keywords and perform operations based on the recognized verbal keywords. In some examples, the history audio data 120 may provide additional context (e.g., conversation) leading up to the first trigger 118 being detected that may be useful for the first application 104A to determine an appropriate action to take or an operation to perform.

In one example, the first application 104A may be a calendar application that is running while a user is making a phone call. In this example, the first trigger 118 may be the verbal keyword 'meeting,' and the history segment 120 may include the user's conversation prior to uttering the keyword 'meeting.' The first application 104A may be configured to analyze the history segment 120 (and/or the contemporary segment 121 of the audio data stream 113 to determine the meeting parameters (e.g., date, time, location, attendees), and propose a calendar item for the meeting based on the meeting parameters.

In another example, the first application 104A may be a surveillance application that is monitoring a user's house. In this example, the first trigger 118 may be an indication of movement at the front door (e.g., from a surveillance camera), and the history audio data 120 may capture an unknown individual's conversation as they approach the front door. The history audio segment may be provided along with corresponding history video segment to a user so that they may assess who is outside before the user opens the front door. Additionally or alternatively, the first application 104A may be configured to analyze the history segment 120 using speech recognition technology to identify the unknown individual.

Figure 1C:
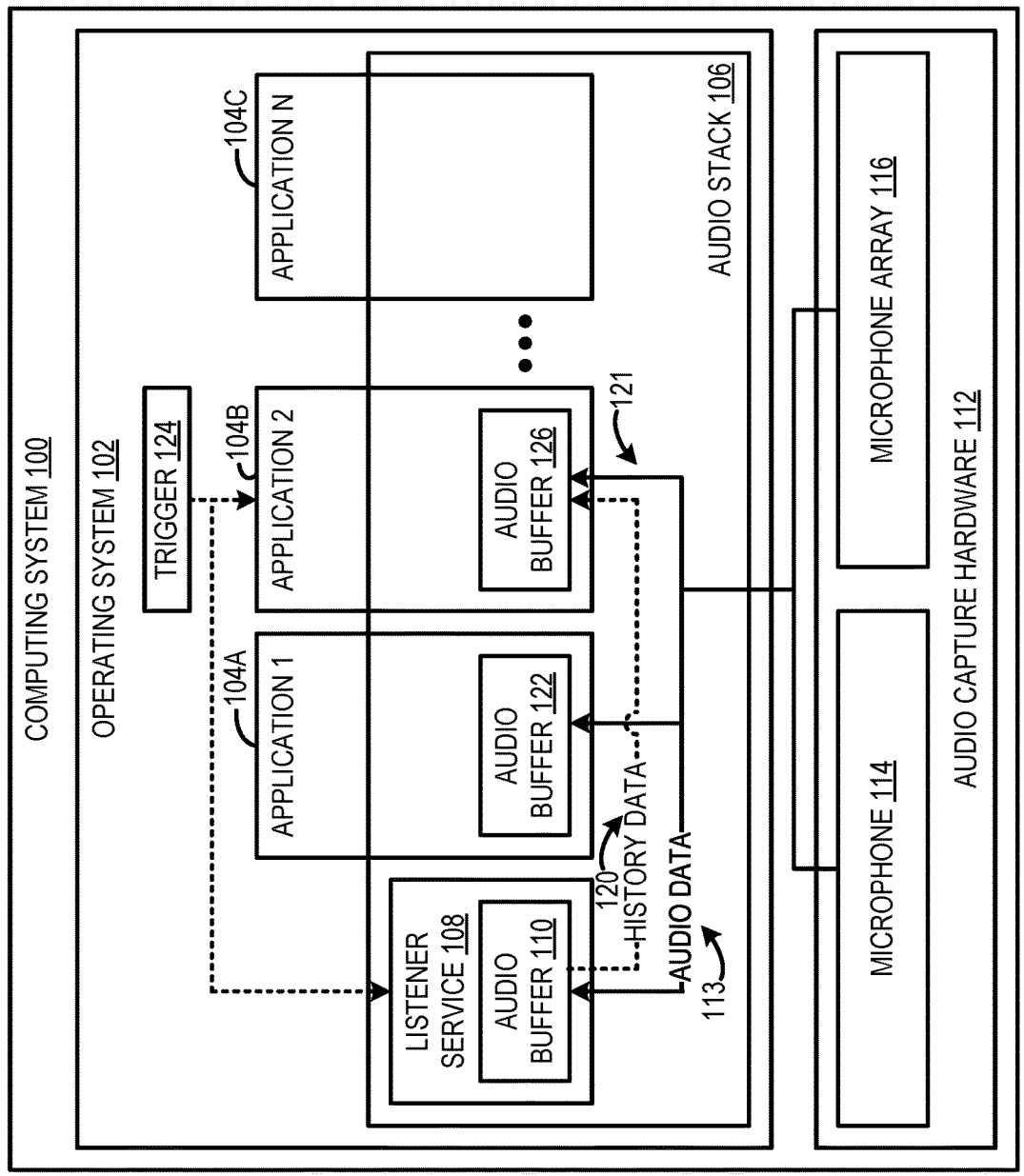

Turning to FIG. 1C, at a time subsequent to the listener service 108 detecting the first trigger 118 (shown in FIG. 1B), the listener service 108 may detect a second trigger 124 associated with the second application 104B. In response to the second trigger 124, the listener service 108 may be configured to provide a history segment of the audio data stream 113 to the second application 104B. The history segment provided to the second application 104B may be captured during a window of time ranging from a time prior to the second trigger 124 being detected up to (or beyond) the second trigger 124 being detected. The history segment provided to the second application 104B may differ from the history segment provided to the first application 104A responsive to the first trigger 118 (shown in FIG. 1B), because the first trigger 118 and the second trigger 124 occur at different times. In other words, the two different history segments of the audio data stream 113 correspond to two different windows of time. Optionally, the history segment 120 may be copied from the rolling audio buffer 110 to a second audio buffer 126 associated with and/or controlled by the second application 104B based on the second trigger 124.

Furthermore, the listener service 108 may be configured to, in response to the second trigger 124, provide a contemporary segment 121 of the captured audio data stream 113 from the audio capture hardware 112 to the second application 104B. As such, the second application 104B may receive both the history segment 120 and the contemporary segment 121 of the audio data stream 113. Optionally, the second application 104B may store the contemporary segment 121 of the captured audio data stream 113 in the second audio buffer 126. Alternatively, in some implementations, the contemporary segment 121 of the audio data stream 113 may be provided to the second application 104B via the rolling audio buffer 110 instead of being diverted directly from the audio capture hardware 112 responsive to the second trigger 124. The second application 104B may continue to receive the contemporary segment 121 of the audio data stream 113 for any suitable duration based on any suitable conditions. The second application 104B may perform any suitable operations based on the history segment 120 (and/or the contemporary segment 121) of the audio data stream 113. In some examples, the first application 104A and the second application 104B may perform different operations based on the respective history segments received from the rolling audio buffer 110. In other examples, the first application 104A and the second application 104B may perform the same operations based on the respective history segments received from the rolling audio buffer 110.

Furthermore, the first application 104A may continue to receive the audio data stream 113 and perform any suitable operations based on the audio data stream 113. The first application 104A may stop receiving the audio data stream 113 at any suitable time based on any suitable conditions.

Figure 1D:
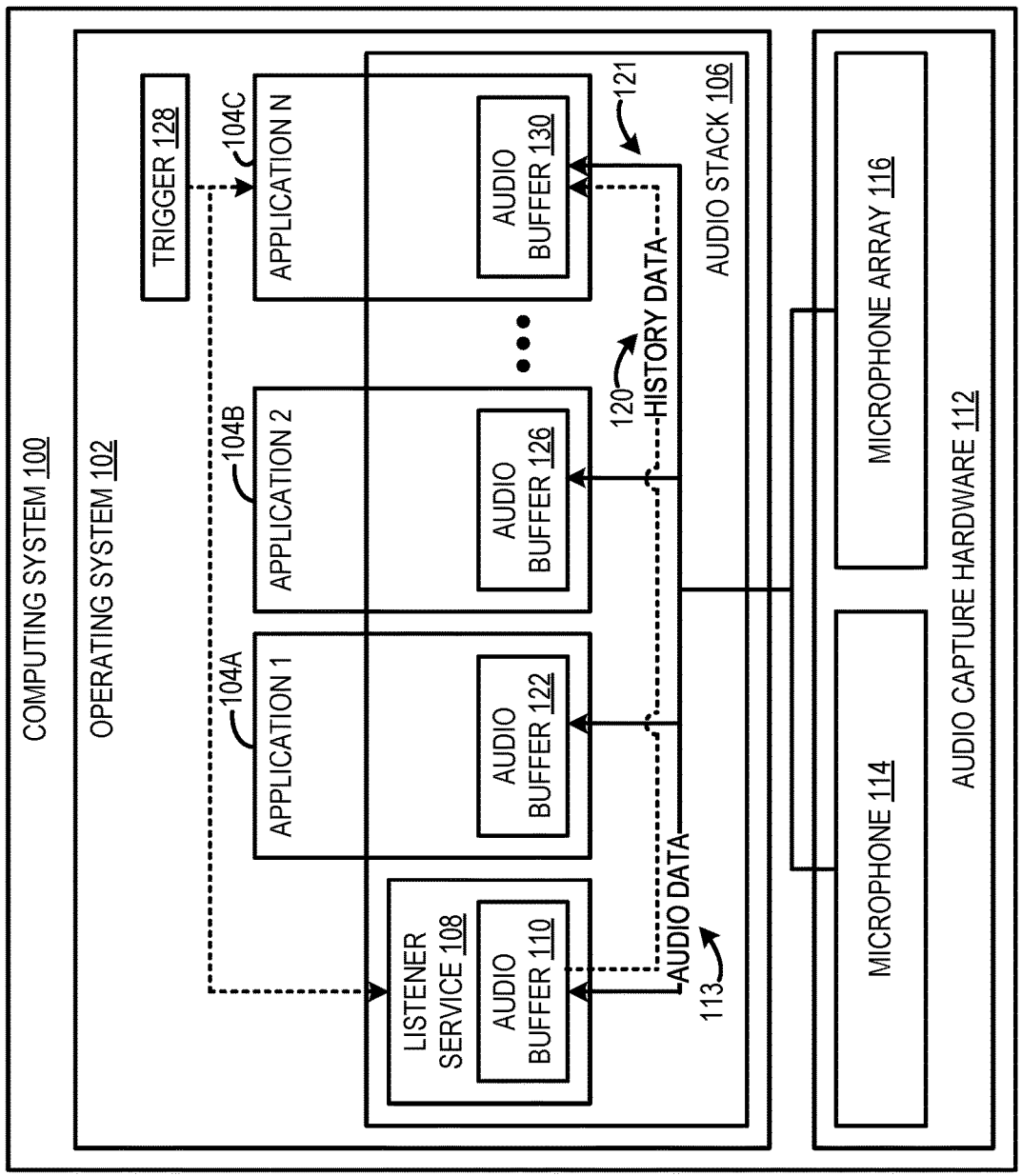

Turning to FIG. 1D, at a time subsequent to the listener service 108 detecting the second trigger 124 (shown in FIG. 1C), the listener service 108 may detect a third trigger 128 associated with the N" application 104C. In response to the third trigger 128, the listener service 108 may be configured to provide the history segment 120 of the audio data stream 113 from the rolling audio buffer 110 to the N" application 104C. The history segment 120 may be captured during a window of time ranging from a time prior to the third trigger 128 being detected up to (or beyond) the third trigger 128 being detected. The history segment 120 provided to the $N^{th}$ application 104C may differ from the history segment provided to the first application 104A responsive to the first trigger 118 (shown in FIG. 1B) and the history segment provided to the second application 104B responsive to the second trigger 124 (shown in FIG. 1C), because each of the first trigger 118, the second trigger 124, and the third trigger 128 occur at different times. In other words, the three different history segments correspond to three different windows of time of the captured audio data stream 113. Optionally, the history segment 120 may be copied from the rolling audio buffer 110 to a third audio buffer 130 associated with and/or controlled by the $N^{th}$ application 104C.

Furthermore, the listener service 108 may be configured to, in response to the third trigger 128, provide a contemporary segment 121 of the captured audio data stream 113 from the audio capture hardware 112 to the $N^{th}$ application 104C. As such, the $N^{th}$ application 104C may receive both the history segment 120 and the contemporary segment 121 of the audio data stream 113. Optionally, the $N^{th}$ application 104C may store the contemporary audio segment 121 of the captured audio data stream 113 in the third audio buffer 130. Alternatively, in some implementations, the audio data stream 113 may be provided to the $N^{th}$ application 104C via the rolling audio buffer 110 instead of being diverted directly from the audio capture hardware 112 responsive to the third trigger 128. The $N^{th}$ application 104C may continue to receive the contemporary segment 121 of the audio data stream 113 for any suitable duration based on any suitable conditions. The $N^{th}$ application 104C may perform any suitable operations based on the history audio data 120 and the audio data stream 113. In some examples, the first application 104A, the second application 104B, and the $N^{th}$ application 104C may perform different operations based on the respective history segments received from the rolling audio buffer 110. In other examples, the first application 104A, the second application 104B, and the $N^{th}$ application 104C may perform the same operations based on the respective history segments received from the rolling audio buffer 110.

Furthermore, the first application 104A and the second application 104B may continue to receive the audio data stream 113 and perform any suitable operations based on the audio data stream 113. The first application 104A and the second application 104B may stop receiving the audio data stream 113 at any suitable time based on any suitable conditions.

By maintaining a shared memory space in the form of the rolling audio buffer 110 at the operating system level and providing segments of history audio data to different ones of the plurality of applications 104 based on different triggers associated with the different applications, each of the plurality of applications 104 does not have to allocate memory and consume power to acquire the captured audio data stream 113 prior to a trigger. Moreover, each application may still benefit from receiving audio data captured prior to a trigger associated with the application.

It will be appreciated that the listener service 108 may be configured to detect trigger(s) and provide history audio data to any suitable number of applications at any suitable time. It will be appreciated that the rolling audio buffer and the applications specific audio buffers may take any suitable alternative form of memory space.

Operating system 102, the plurality of applications 104, the audio stack 106, and the listener service 108 may be implemented as one or more applications, objects, modules, programs, engines, and/or other software or instantiated logic, and may operate to provide services in conjunction with the computing system 100.

Although the herein disclosed concepts are described in the context of providing history audio data to different applications based on triggers, it will be appreciated that these concepts are broadly applicable to other forms of data. For example, the disclosed concepts may be implemented to additionally or alternatively provide historical video data or other forms of temporal data to applications based on triggers.

Figure 2:
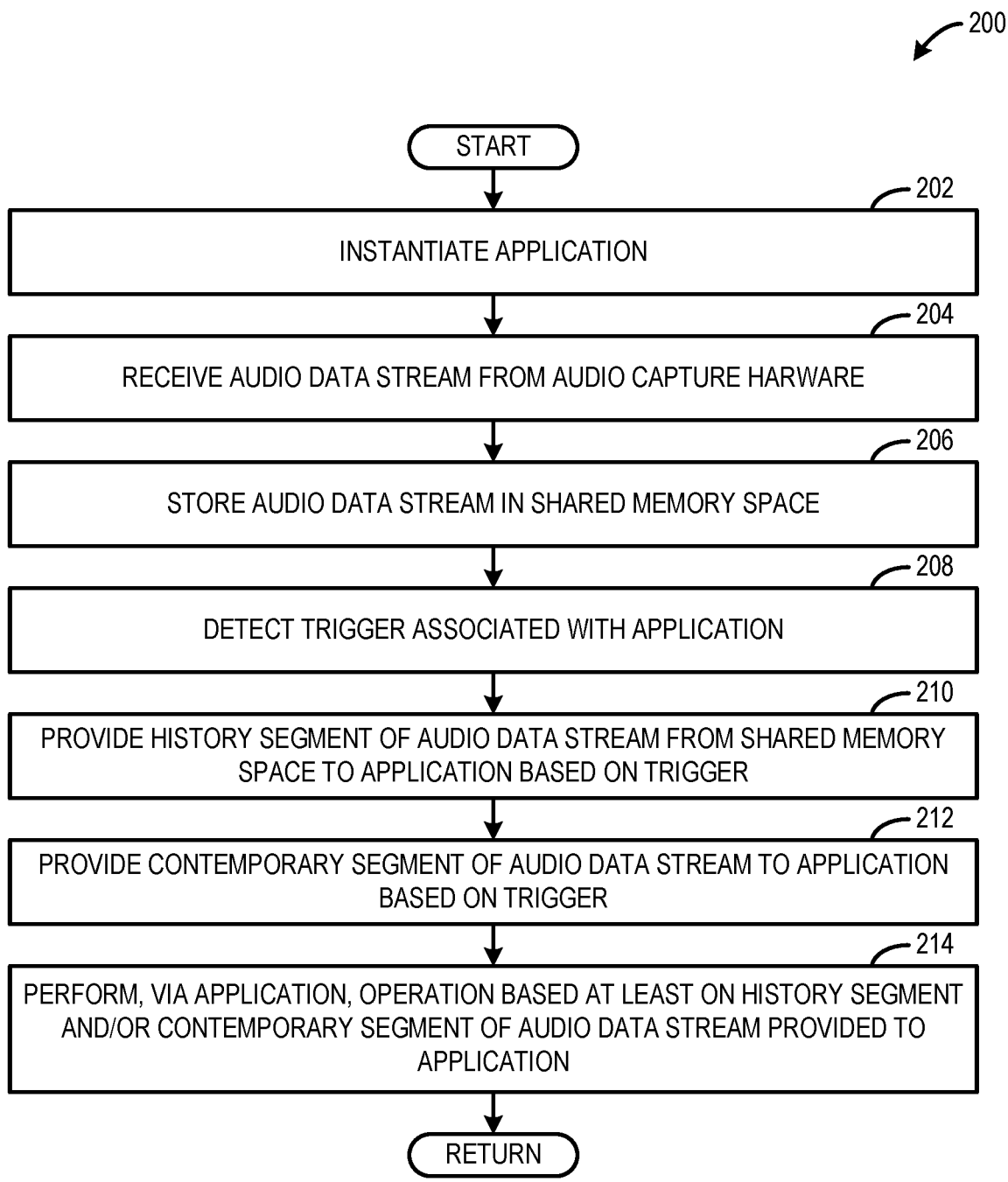
FIG. 2 is a flowchart of an example method for providing historical captured audio data to an application.

FIG. 2 is a flowchart of an example method 200 for providing historical captured audio data to an application. For example, the method 200 may be performed by the operating system 102 and/or the listener service 108 of the audio stack 106 of the computing system 100 of FIGS. 1A-1D. At 202, the method 200 includes instantiating an application. In some examples, the method may include instantiating a plurality of applications. At 204, the method 200 includes receiving an audio data stream from audio capture hardware. In some examples, the audio data stream may be received from audio capture hardware of the computing system. In some examples, the audio data stream may be received from audio capture hardware of a remote computing system. At 206, the method 200 includes storing the audio data stream in a shared memory space (e.g., a rolling audio buffer). The shared memory space may be controlled at the operating system level via the audio stack such that no one particular application has exclusive control of the shared memory space. The shared memory space may be accessible by the application and other applications that are instantiated (if any). At 208, the method 200 includes detecting a trigger associated with the application. In some examples, the operating system and/or the listener service may detect the trigger. In some examples, the application may detect the trigger and notify the operating system and/or the listener service of the trigger. At 210, the method 200 includes providing a history segment of the audio data stream from the rolling audio buffer to the application based on the trigger. The history segment is captured prior to the trigger. Optionally, the history segment may be stored in an application-specific audio buffer associated with the application. In other words, the history segment may be copied from the shared memory space to the application-specific memory space based on the trigger. At 212, the method 200 includes providing a contemporary segment of the audio data stream to the application based on the trigger. The contemporary segment is captured subsequent to the trigger. In some examples, the contemporary segment may be provided directly from the audio capture hardware to the application. In some examples, the contemporary segment may be provided from the shared memory space to the application. Optionally, the contemporary segment of the audio data stream may be stored in the application-specific audio buffer associated with the application. At 214, the method 200 includes performing, via the associated application, an operation based at least on the history segment and/or the contemporary segment of the audio data stream provided to the application.

It will be appreciated that the method 200 may be performed to provide history audio data from the shared memory space to any suitable number of applications of the computing system based on any suitable triggers. By storing the audio data stream in the shared memory space and providing segments of the audio data stream to different applications based on different triggers associated with the different applications, the audio data stream need not be duplicated in its entirety for each application. As such, overall power consumption, memory usage, processor utilization, and/or other aspects of the computing system may be improved relative to a computing system where each application continuously captures duplicate audio data from audio capture hardware.

In some implementations, the methods and processes described herein may be tied to a computing system of one or more computing devices. In particular, such methods and processes may be implemented as a computer-application program or service, an application-programming interface (API), a library, and/or other computer-program product.

Figure 3:
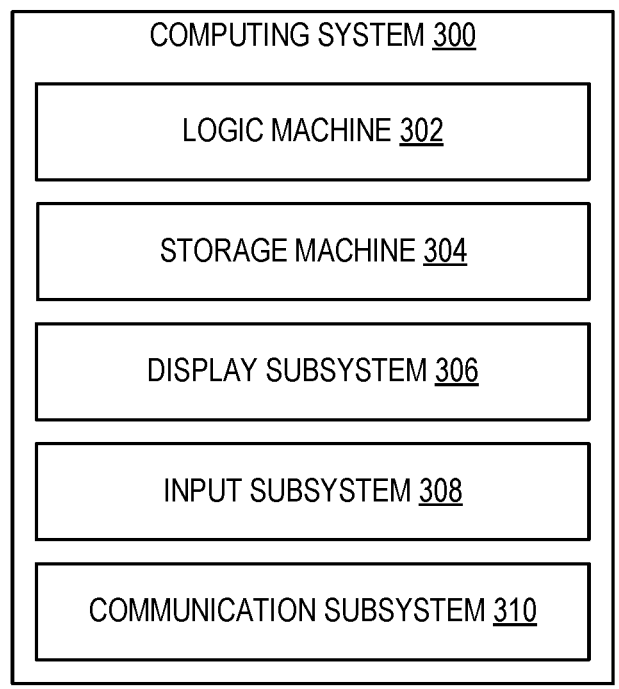
FIG. 3 shows an example computing system.

FIG. 3 schematically shows a non-limiting implementation of a computing system 300 that can enact one or more of the methods and processes described above. Computing system 300 is shown in simplified form. Computing system 300 may take the form of one or more personal computers, server computers, tablet computers, home-entertainment computers, network computing devices, gaming devices, mobile computing devices, mobile communication devices (e.g., smart phone), and/or other computing devices. For example, the computing system 300 may take the form of the computing system 100 shown in FIGS. 1A-1D.

Computing system 300 includes a logic machine 302 and a storage machine 304. Computing system 300 may optionally include a display subsystem 306, input subsystem 308, communication subsystem 310, and/or other components not shown in FIG. 3.

Logic machine 302 includes one or more physical devices configured to execute instructions. For example, the logic machine 302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 302 may include one or more processors configured to execute software instructions. Additionally or alternatively, the logic machine 302 may include one or more hardware or firmware logic machines configured to execute hardware or firmware instructions. Processors of the logic machine 302 may be single-core or multi-core, and the instructions executed thereon may be configured for sequential, parallel, and/or distributed processing. Individual components of the logic machine 302 optionally may be distributed among two or more separate devices, which may be remotely located and/or configured for coordinated processing. Aspects of the logic machine 302 may be virtualized and executed by remotely accessible, networked computing devices configured in a cloud-computing configuration.

Storage machine 304 includes one or more physical devices configured to hold instructions executable by the logic machine 302 to implement the methods and processes described herein. When such methods and processes are implemented, the state of storage machine 304 may be transformed—e.g., to hold different data.

Storage machine 304 may include removable and/or built-in devices. Storage machine 304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 304 may include volatile, nonvolatile, dynamic, static, read/write, read-only, random-access, sequential-access, location-addressable, file-addressable, and/or content-addressable devices.

It will be appreciated that storage machine 304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 302 and storage machine 304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 implemented to perform a particular function. In some cases, a module, program, or engine may be instantiated via logic machine 302 executing instructions held by storage machine 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 306 may be used to present a visual representation of data held by storage machine 304. This visual representation may take the form of a graphical user interface (GUI). As the herein described methods and processes change the data held by the storage machine 304, and thus transform the state of the storage machine 304, the state of display subsystem 306 may likewise be transformed to visually represent changes in the underlying data. Display subsystem 306 may include one or more display devices utilizing virtually any type of technology. Such display devices may be combined with logic machine 302 and/or storage machine 304 in a shared enclosure, or such display devices may be peripheral display devices.

When included, input subsystem 308 may comprise or interface with one or more user-input devices such as a keyboard, mouse, touch screen, or game controller. In some implementations, the input subsystem 308 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 310 may be configured to communicatively couple computing system 300 with one or more other computing devices. Communication subsystem 310 may include wired and/or wireless communication devices compatible with one or more different communication protocols. As non-limiting examples, the communication subsystem 310 may be configured for communication via a wireless telephone network, or a wired or wireless local- or wide-area network. In some implementations, the communication subsystem 310 may allow computing system 300 to send and/or receive messages to and/or from other devices via a network such as the Internet.

In an example, a computing system comprises one or more logic machines, and one or more storage machines holding instructions executable by the one or more logic machines to instantiate a plurality of applications, receive, via audio capture hardware, an audio data stream, store the audio data stream in a shared memory space accessible by the plurality of applications, detect a trigger associated with an application of the plurality of applications, provide, from the shared memory space to the application, a history segment of the audio data stream based on the trigger, the history segment captured prior to the trigger, and provide, to the application, a contemporary segment of the audio data stream based on the trigger, the contemporary segment captured subsequent to the trigger. In this example and/or other examples, the one or more storage machines may hold instructions executable by the one or more logic machines to perform, via the application, an operation based on at least the history segment of the audio data stream. In this example and/or other examples, each application of the plurality of applications may be associated with a different set of one or more triggers that each cause a history segment of the audio data stream to be provided from the shared memory space to the application associated with that trigger. In this example and/or other examples, the application may be a first application, the first application and a second application of the plurality of applications may be both associated with the trigger such that the history segment of the audio data stream is provided from the shared memory space to both the first application and the second application based on the trigger. In this example and/or other examples, the one or more storage machines may hold instructions executable by the one or more logic machines to instantiate an application-specific memory space for the application, and providing the history segment may include copying the history segment from the shared memory space to the application-specific memory space. In this example and/or other examples, the shared memory space may include a rolling buffer, and the audio data stream may be continuously received from the audio capture hardware and stored in the rolling buffer. In this example and/or other examples, the contemporary segment of the audio data stream may be provided from the shared memory space to the application based on the trigger. In this example and/or other examples, the contemporary segment of the audio data stream may be provided from the audio capture hardware to the application based on the trigger. In this example and/or other examples, the trigger may be detected by an operating system of the computing system. In this example and/or other examples, detecting the trigger may include receiving a notification of the trigger from the application associated with the trigger. In this example and/or other examples, the trigger may be based on user input. In this example and/or other examples, the trigger may be based on a verbal keyword or phrase recognized in the audio data stream. In this example and/or other examples, the history segment may have a predetermined duration that occurs prior to the trigger. In this example and/or other examples, the trigger may be one of a plurality of triggers, the history segment may have a duration that occurs prior to the trigger and may be determined based on the detected trigger such that history segments provided to the application have different durations based on different triggers being detected. In this example and/or other examples, the history segment may have a duration that occurs prior to the trigger and may be determined based on the associated application such that history segments provided to different application have different durations.

In an example, an audio capture method performed by a computing system comprises instantiating a plurality of applications, receiving, via audio capture hardware, an audio data stream, storing the audio data stream in a shared memory space accessible by the plurality of applications, detecting a trigger associated with an application of the plurality of applications, providing, from the shared memory space to the application, a history segment of the audio data stream based on the trigger, the history segment captured prior to the trigger, and providing, to the application, a contemporary segment of the audio data stream, the contemporary segment captured subsequent to the trigger. In this example and/or other examples, the method may further comprise performing, via the application, an operation based on at least the history segment of the audio data stream. In this example and/or other examples, the method may further comprise instantiating an application-specific memory space for the application, and providing the history segment may include copying the history segment from the shared memory space to the application-specific memory space. In this example and/or other examples, the application may be a first application, the first application and a second application of the plurality of applications may be both associated with the trigger such that the history segment of the audio data stream is provided from the shared memory space to both the first application and the second application based on the trigger.

In an example, a computing system comprises one or more logic machines, and one or more storage machines holding instructions executable by the one or more logic machines to instantiate an application, receive an audio data stream, store the audio data stream in a shared memory space accessible by the application and other applications that are instantiated, detect a trigger associated with the application, provide, from the shared memory space to the application, a history segment of the audio data stream based on the trigger, the history segment captured prior to the trigger, and provide, to the application, a contemporary segment of the audio data stream based on the trigger, the contemporary segment captured subsequent to the trigger.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
one or more logic machines; and
one or more storage machines holding instructions executable by the one or more logic machines to:
instantiate a plurality of applications;
receive, via audio capture hardware, an audio data stream;
store the audio data stream in a shared memory space accessible by the plurality of applications;
detect a trigger associated with the plurality of applications;
provide, from the shared memory space to the plurality of applications, a history segment of the audio data stream based on the trigger, the history segment captured prior to the trigger; and
provide, to the plurality of applications, a contemporary segment of the audio data stream based on the trigger, the contemporary segment captured subsequent to the trigger.

2. The computing system of claim 1, wherein the one or more storage machines hold instructions executable by the one or more logic machines to perform, via at least one of the plurality of applications, an operation based on at least the history segment of the audio data stream.

3. The computing system of claim 1, wherein each application of the plurality of applications is associated with a different set of one or more triggers that each cause the history segment of the audio data stream to be provided from the shared memory space to the application associated with that trigger.

4. The computing system of claim 1, wherein the one or more storage machines hold instructions executable by the one or more logic machines to instantiate an application-specific memory space for each application of the plurality of applications, and wherein providing the history segment includes copying the history segment from the shared memory space to the application-specific memory space for each application of the plurality of applications.

5. The computing system of claim 1, wherein the shared memory space includes a rolling buffer, and wherein the audio data stream is continuously received from the audio capture hardware and stored in the rolling buffer.

6. The computing system of claim 1, wherein the contemporary segment of the audio data stream is provided from the shared memory space to the plurality of applications based on the trigger.

7. The computing system of claim 1, wherein the contemporary segment of the audio data stream is provided from the audio capture hardware to the plurality of applications based on the trigger.

8. The computing system of claim 1, wherein the trigger is detected by an operating system of the computing system.

9. The computing system of claim 1, wherein detecting the trigger includes receiving a notification of the trigger from an application of the plurality of applications associated with the trigger.

10. The computing system of claim 1, wherein the trigger is based on user input.

11. The computing system of claim 9, wherein the trigger is based on a verbal keyword or phrase recognized in the audio data stream.

12. The computing system of claim 1, wherein the history segment has a predetermined duration that occurs prior to the trigger.

13. The computing system of claim 1, wherein the trigger is one of a plurality of triggers, wherein the history segment has a duration that occurs prior to the trigger and is determined based on the detected trigger such that different instances of the history segment provided to the plurality of applications have different durations based on different triggers being detected.

14. The computing system of claim 1, wherein different instances of the history segment provided to different applications have different durations that occurs prior to the trigger, and wherein the different durations are based on the different applications.

15. An audio capture method performed by a computing system, the method comprising:
instantiating a plurality of applications;
receiving, via audio capture hardware, an audio data stream;
storing the audio data stream in a shared memory space accessible by the plurality of applications;
detecting a trigger associated with the plurality of applications;
providing, from the shared memory space to the plurality of applications, a history segment of the audio data stream based on the trigger, the history segment captured prior to the trigger; and
providing, to the plurality of applications, a contemporary segment of the audio data stream, the contemporary segment captured subsequent to the trigger.

16. The method of claim 15, further comprising:
performing, via at least one of the plurality of applications, an operation based on at least the history segment of the audio data stream.

17. The method of claim 15, further comprising:
instantiating an application-specific memory space for each application of the plurality of applications, and wherein providing the history segment includes copying the history segment from the shared memory space to the application-specific memory space for each application of the plurality of applications.

18. A computing system, comprising:
one or more logic machines; and
one or more storage machines holding instructions executable by the one or more logic machines to:
instantiate an application;
receive an audio data stream;
store the audio data stream in a shared memory space accessible by the application and other applications that are instantiated;
detect a trigger of a plurality of triggers associated with the application, wherein different triggers of the plurality of triggers have different trigger-specific durations;
provide, from the shared memory space to the application, a history segment of the audio data stream based on the trigger, the history segment captured prior to the trigger and the history segment having a trigger-specific duration corresponding to the detected trigger; and provide, to the application, a contemporary segment of the audio data stream based on the trigger, the contemporary segment captured subsequent to the trigger.

* * * * *